United States Patent [19]

Yokoyama

[11] Patent Number: 4,699,604
[45] Date of Patent: * Oct. 13, 1987

[54] REDUCTION RATIO CONTROLLING MECHANISM FOR A CONTINUOUSLY VARIABLE AUTOMATIC TRANSMISSION OF A VEHICLE

[75] Inventor: Shoji Yokoyama, Aichi, Japan

[73] Assignee: Aisin-Warner K.K., Anjo, Japan

[ * ] Notice: The portion of the term of this patent subsequent to Aug. 13, 2002 has been disclaimed.

[21] Appl. No.: 862,158

[22] Filed: May 12, 1986

Related U.S. Application Data

[63] Continuation of Ser. No. 453,721, Dec. 27, 1982, abandoned.

[51] Int. Cl.$^4$ .................. B60K 41/14; F16H 55/52
[52] U.S. Cl. ................................ 474/18; 474/28; 474/70; 74/868
[58] Field of Search .................... 474/18, 28, 70; 74/867–869, 859, 863, 864

[56] References Cited

U.S. PATENT DOCUMENTS

| | | | |
|---|---|---|---|
| 4,419,910 | 12/1983 | Miki et al. | 74/869 |
| 4,534,243 | 8/1985 | Yokoyama et al. | 474/18 |

FOREIGN PATENT DOCUMENTS

| | | | |
|---|---|---|---|
| 0061732 | 10/1982 | European Pat. Off. | 474/18 |
| 0161346 | 10/1982 | Japan | 474/18 |
| 2075620 | 11/1981 | United Kingdom | 474/18 |

Primary Examiner—Stephen J. Novosad
Assistant Examiner—Bruce M. Kisliuk
Attorney, Agent, or Firm—Cooper, Dunham, Griffin & Moran

[57] ABSTRACT

A reduction ratio controlling mechanism provided within the hydraulic control system of a continuously variable automatic transmission of a vehicle including a V-belt type continuously variable transmission which comprises an input pulley and an output pulley, the effective diameter of each of said pulleys being variable by means of a corresponding hydraulic servomechanism, and a V-belt extending between said input and said output pulleys, for changing the reduction ratio of said continuously variable transmission by supplying a hydraulic fluid to and by draining same from the hydraulic servomechanism of said input pulley.

The reduction ratio controlling mechanism comprises an electromagnetic up-shift valve and an electromagnetic down-shift valve each capable of producing a solenoid pressure corresponding to the running condition of the vehicle by regulating the line pressure applied thereto, and a reduction ratio control valve having a spool movable under the control of the spring force of a spring provided on one side of the spool and the solenoid pressure applied to the other side of the spool.

The spring force of the spring works in the direction of movement of the spool during down-shift operation.

3 Claims, 39 Drawing Figures

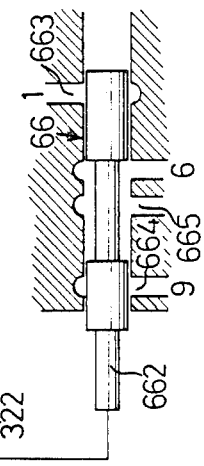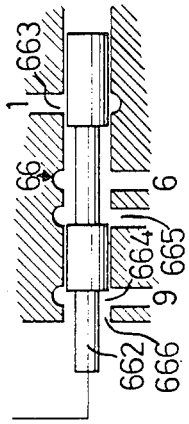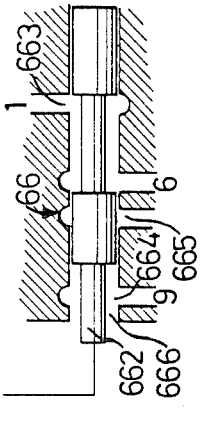
Fig.5A  Fig.5B  Fig.5C
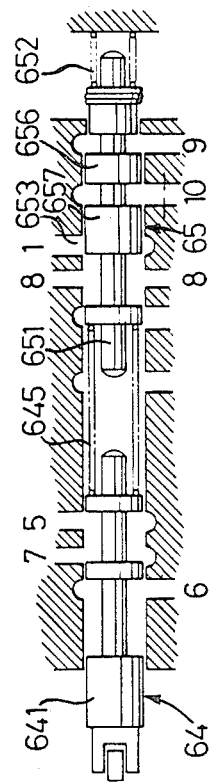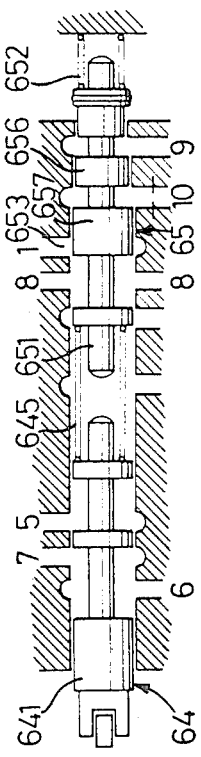
Fig.4A  Fig.4B

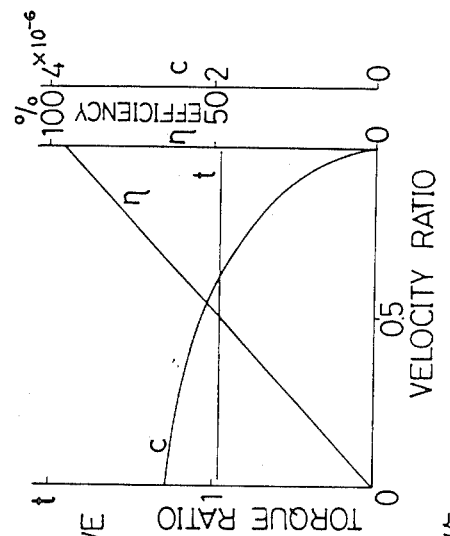
Fig.14
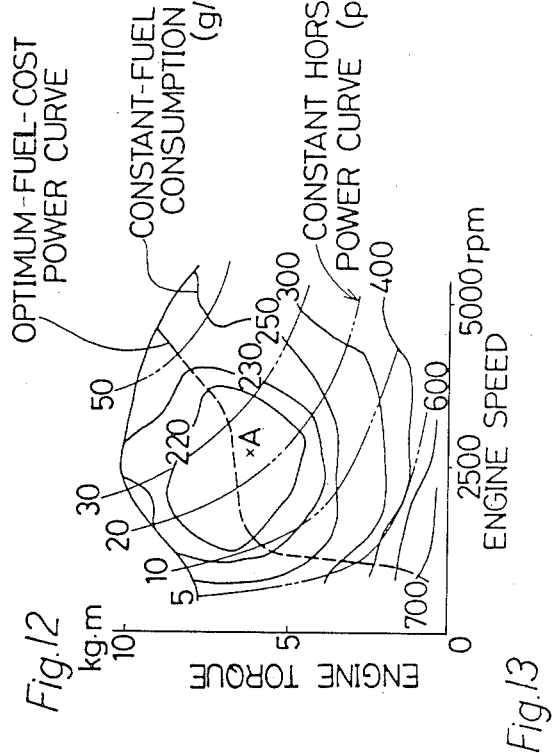
Fig.12
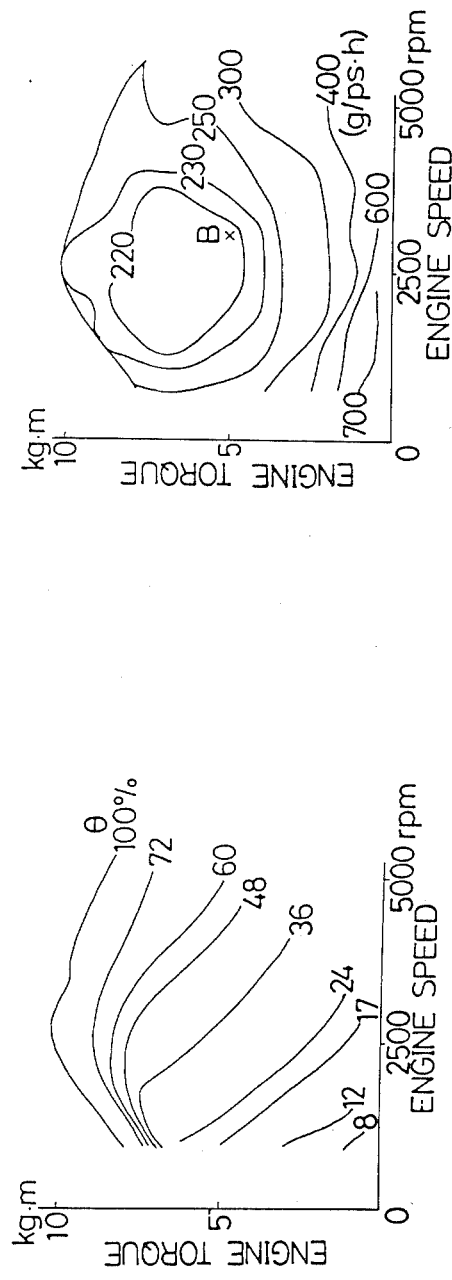
Fig.15
Fig.13

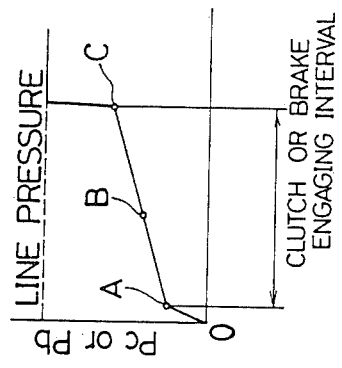
Fig.29
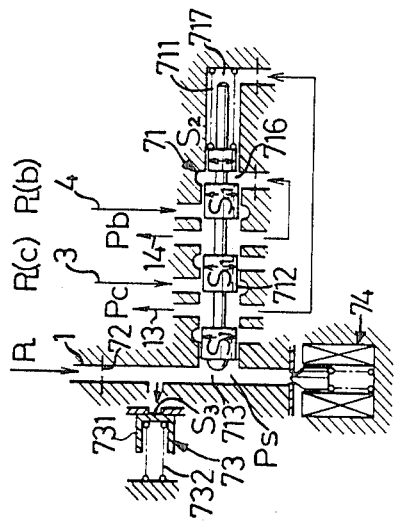
Fig.28
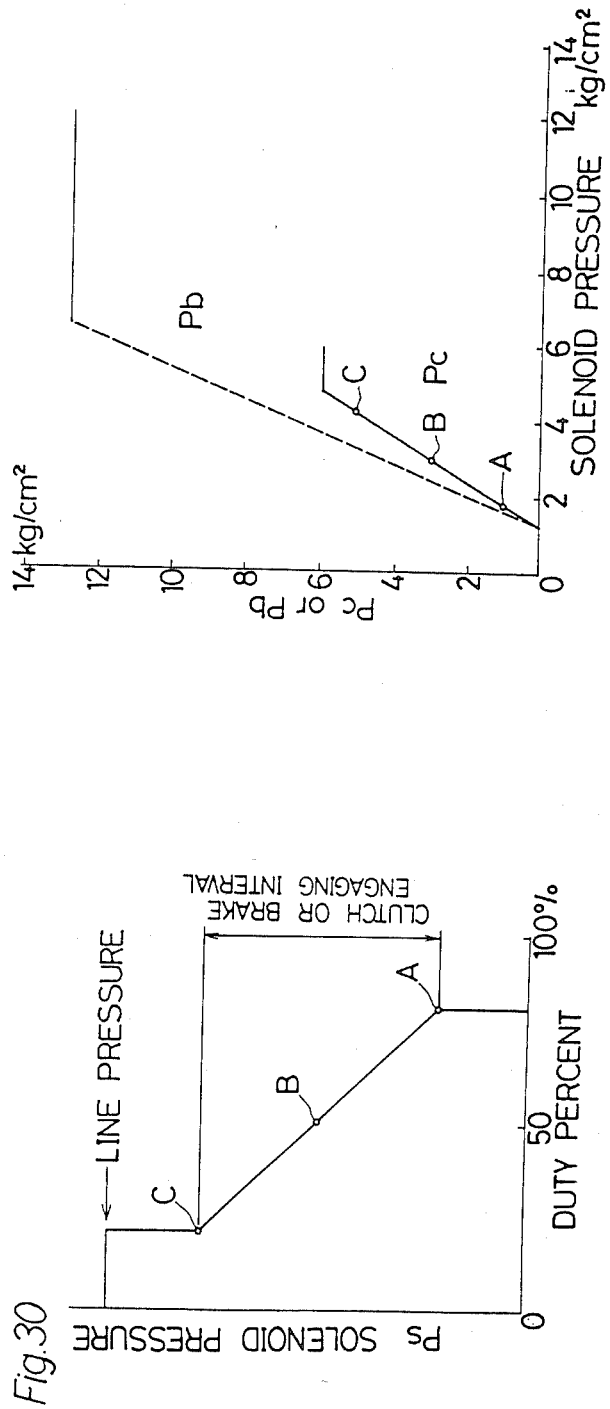
Fig.31
Fig.30

REDUCTION RATIO CONTROLLING MECHANISM FOR A CONTINUOUSLY VARIABLE AUTOMATIC TRANSMISSION OF A VEHICLE

This is a continuation of application Ser. No. 453,721, filed Dec. 27, 1982 now abandoned.

BACKGROUND OF THE INVENTION

1. Field of the Invention

This invention relates to a reduction ratio control mechanism provided within the hydraulic control system of a continuously variable automatic transmission for a vehicle employing a V-belt continuously variable transmission controlled by means of hydraulic servomechanisms, and adapted to control the reduction ratio (the torque ratio) of the V-belt type continuously variable transmission.

2. Description of the Prior Art

A V-belt type continuously variable transmission constitutes, in combination with a forward-reverse drive changing device and a fluid coupling, a continuously variable automatic transmission for a vehicle. This continuously variable automatic transmission, however, will not be able to produce a sufficient torque and hence the vehicle can not start smoothly, when the continuously variable transmission is not set at the maximum reduction ratio at the start of the vehicle. Generally, it is difficult to change the reduction ratio of a V-belt type continuously variable transmission while the operation thereof is interrupted. Accordingly, quick down-shift operation is necessary when the vehicle is stopped suddenly. The principal factors dominating the speed of the down-shift operation are the level of the fluid pressure (the line pressure) applied to the hydraulic servomechanism of the V-belt type continuously variable transmission and the operating speed (the response) of the valves of the reduction ratio control mechanism. The conventional reduction ratio control mechanism includes, as shown in FIG. 34, a reduction ratio control valve 81 disposed between a hydraulic fluid supply passage 2 connected to the hydraulic servomechanism, which receives an increased rate of the hydraulic fluid during down-shift operation (reducing speed) and an reduced rate of the hydraulic fluid during up-shift operation, of the V-belt type continuously variable transmission and a line pressure passage 1 connected to a hydraulic source, for controlling the communication of the hydraulic servomechanism with the hydraulic source or with a drain port, and having a drain port 813 and a drain port 814 for relieving the hydraulic pressure working on the hydraulic servomechanism, a spring 811 for applying a spring force to the spool of the reduction ratio control valve, an up-shift electromagnetic valve 84 and a down-shift electromagnetic valve 85. This reduction ratio control mechanism is adapted to control the down-shift operation by intermittently reducing the pressure applied to the spool, through the operation of the down-shift electromagnetic valve 85 so that the spool moves while compressing the spring 811 to relieve progressively the line pressure held by the closing operation of the up-shift electromagnetic valve through the drain port 813. The spool stops when the external forces working on the spool become equilibrated. Since the spool moves against the spring force of the spring 811 during the down-shift operation, the quick response of the spool is impossible.

Accordingly, the response of the spool can be improved by inverting the respective position of the up-shift electromagnetic valve 84 and the down-shift electromagnetic valve 85 and the respective position of the line pressure passage 1 and the drain port 814 for relieving the hydraulic pressure of the servomechanism of the V-belt continuously variable transmission as shown in FIG. 35, so that the spool will move along the direction of the spring force of the spring during the down-shift operation whereby the moving speed of the spool is increased. According to this method, however, since the hydraulic fluid is drained through the valve port of the down-shift electromagnetic valve 85 and through the drain port 813 at the same time, the line pressure is reduced due to increased draining rate and hence the pressure applied to the hydraulic servomechanism of the V-belt continuously variable transmission is decreased so that the speed of down-shift operation of the V-belt continuously variable transmission is reduced.

SUMMARY OF THE INVENTION

Accordingly, an object of the present invention is to provide a reduction ratio control mechanism for the continuously variable automatic transmission of a vehicle, capable of increasing the speed of the down-shift operation.

A further object of the present invention is to provide a reduction ratio control mechanism for the continuously variable automatic transmission of a vehicle, capable of reducing the leakage of the hydraulic fluid and hence capable of reducing the size of the oil pump and the fuel consumption rate.

A still further object of the present invention is to provide a reduction ratio control mechanism for the continuously variable automatic transmission of a vehicle, in which valve sticking hardly occurs and hence the malfunction or the delay of the reduction ratio controlling operation can be prevented.

BRIEF DESCRIPTION OF THE DRAWINGS

FIGS. 4A and 4B are an explanetory representation illustrating the sequential operating conditions of the detent valve and the throttle valve;

FIGS. 5A–5C are an explanetory representation illustrating the sequential operating conditions of the torque ratio valve;

FIG. 12 is a graphical representation of the engine power for the optimum fuel consumption;

FIG. 13 is a graphical representation of the output performance of an engine;

FIG. 14 is a graphical representation of the performance of a fluid transmission mechanism;

FIG. 15 is a graphical representation of the equivalent fuel consumption rate of an engine;

FIG. 28 is an explanatory illustration of the operation of the shift controlling mechanism;

FIG. 29 is a graphical representation of the characteristic of the oil pressure applied to the hydraulic servomechanism of the input pulley and the hydraulic servomechanism of the output pulley;

FIG. 30 is a graphical representation of solenoid pressure Ps;

FIG. 31 is a graphical representation of the output oil pressure of the shift control valve;

DETAILED DESCRIPTION OF THE PREFERRED EMBODIMENTS

The present invention will be described hereinafter on the basis of a preferred embodiment thereof in connection with appended drawings.

Figure 1:
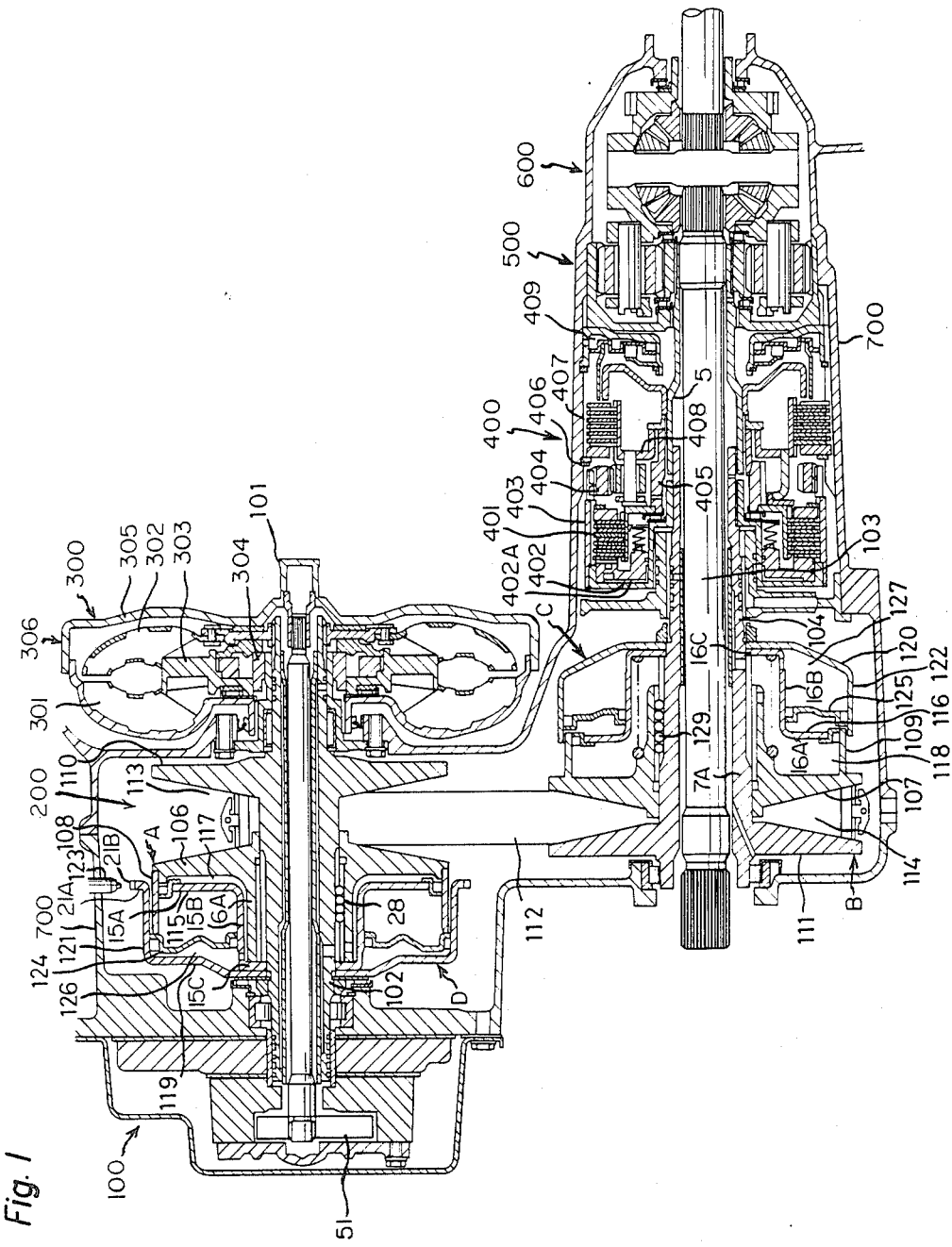
FIG. 1 is a sectional view of a continuously variable automatic transmission of a vehicle.

FIG. 1 shows a V-belt type continuously variable automatic transmission for a vehicle, which is controlled by a hydraulic control system. The continuously variable automatic transmission 100 for a vehicle comprises a V-belt type continuously variable transmission 200, a fluid coupling 300 such as a torque converter connected to the input part of the transmission 200, a forward-reverse drive changing planetary transmission 400 connected, in this embodiment, to the output part of the transmission 200, a reduction gearing 500 connected to the output part of the planetary transmission 400 and a differential gearing 600 connected to the reduction gearing 500. Any mechanism other than the planetary gearing is applicable to the forward-reverse drive changing mechanism.

The input shaft 101 of the continuously variable automatic transmission 100 is connected to the output shaft of an engine. A tubular first intermediate shaft 102 forms the input shaft of the V-belt continuously variable transmission 200. The input shaft 101 and the first intermediate shaft 102 are connected through the fluid coupling 300, a torque converter in this embodiment. The output shaft of the continuously variable automatic transmission 100 is indicated at 103. A tubular second intermediate shaft 104 forming the output shaft of the V-belt type continuously variable transmission 200 receives coaxially the output shaft 103 therethrough. The second intermediate shaft 104 and the output shaft 103 are connected through the forward-reverse drive changing planetary transmission 400, a third intermediate shaft 105, a reduction gear mechanism 500 and the differential gearing 600. Reference numerals 106 and 107 designate movable flanges slidably mounted on the first intermediate shaft 102 and the second intermediate shaft 104, respectively, and having tubular bearing parts 6A and 7A extending along the intermediate shafts 102 and 104, respectively. First cylinders 108 and 109 disposed concentrically with the intermediate shafts 102 and 104 are welded to and formed integrally with the movable flanges 106 and 107, respectively. Fixed flanges 110 and 111 are integral with the first intermediate shaft 102 and the second intermediate shaft 104, respectively. The movable flange 106 and the fixed flange 110, and the movable flange 107 and the fixed flange 111 are disposed oppositely to constitute an input pulley A and an output pulley B, respectively. A V-belt 112 is received in the respective V-shaped grooves defined by the surfaces of the corresponding movable flange and the fixed flange. First fixed walls 115 and 116 are fitted in the first cylinders 108 and 109, respectively. The fixed walls 115 and 116 have flange parts 15A and 16A internally in contact with the first cylinders 108 and 109, tubular parts 15B and 16B extending continuously from the flange parts 15A and 16A and fixing parts 15C and 16C continuously extending from the tubular parts 15B and 16B fixed to the intermediate shafts 102 and 104, respectively. The first fixed walls 115 and 116 define together with the movable flanges 106 and 107 serving as side walls first annular oil chambers 117 and 118, respectively. Second fixed walls 119 and 120 are integral with second cylinders 121 and 122 receiving the first cylinders 108 and 109, respectively. The second fixed walls 119 and 120 are disposed adjacently to the fixing parts 15C and 16C of the first fixed walls and are fixed to the intermediate shafts 102 and 104, respectively. The free end (right-hand side in the drawing) of the second cylinder 121 is bent radially outward to form a flange 21A and teeth 21B are formed along the periphery of the flange 21A. An electromagnetic pickup 123 is attached to the case 700 of the automatic transmission at a predetermined position corresponding to the flange 21A. The electromagnetic pickup 123 and the flange 21A constitute a revolving rate detecting device for detecting the revolving rate of the input pulley, namely the revolving rate of the first intermediate shaft 102. The second fixed walls 119 and 120 and annular pressure plates 124 and 125 slidably inserted between the second cylinders 121 and 122 which are integral with the second fixed walls and the tubular parts 15B and 16B of the first fixed walls define second annular oil chamber 126 and 127, respectively.

Spherical bodies 128 and 129 are inserted between the first intermediate shaft 102 and the movable flange 106 and between the second intermediate shaft 104 and the movable flange 10, respectively, in axial grooves formed in the sliding surfaces of those members 102, 104, 106 and 107. These spherical bodies restrains the movable flanges 106 and 107 and the intermediate shafts 102 and 104 from relative rotation.

The V-belt continuously variable transmission 200 comprises the V-belt 112, the input pulley A, the output pulley B, hydraulic servomechanism C and D for the pulleys A and B, respectively. In this V-belt type continuously variable transmission, the movable flanges 106 and 107 are driven to vary the respective widths of the V-shaped grooves 113 and 114 by controlling the respective oil pressures applied to the hydraulic servomechanisms C and D having the first oil chambers 117 and 118 and second oil chambers 126 and 127, respectively, according to the detection signals of the revolving rate of the input pulley, the running speed of the vehicle and the degree of throttle opening, thereby the respective effective radii of the input pulley A and the output pulley B are changed so that stepless speed change is attained according to the running condition of the vehicle.

The fluid coupling 300, namely, a torque converter, is of a known constitution comprising a pump impeller 301, a turbine runner 302, a stator 303 and a one-way clutch 304.

The forward-reverse drive changing planetary transmission 400 comprises a ring gear connected to the second intermediate shaft 104 functioning as the output shaft of the continuously variable transmission 200 through a drum 403 having the cylinder 402A of a hydraulic servomechanism 402 for actuating a multiple disc clutch 401, a sun gear splined to the third intermediate shaft 105 functioning as the output shaft of the planetary transmission 400 and connected to the drum 403 through the multiple disc clutch 401, planetary pinions 406 disposed between and meshed with the sun gear 405 and the ring gear 404 for rotation, a planetary carrier 408 rotatably supporting the planetary pinions 406 and associated with the case 700 of the automatic transmission through a multiple disc brake 407, the hydraulic servomechanism 402 for actuating the multiple disc clutch 401 and a hydraulic servomechanism 409 for actuating the multiple disc brake 407. In the forward-reverse changing planetary transmission 400, the forward gear of a reduction ratio of 1 (one) is given when the multiple disc clutch 401 is engaged while the multiple disc brake 407 is released, and the reverse gear of a reduction ratio of 0.7 is given when the multiple disc clutch 401 is disengaged while the multiple disc brake 407 is engaged. The reduction ratio of 0.7 for the reverse drive is smaller than that of the ordinary transmission for a motor vehicle, however, this reduction ratio proves an appropriate total reduction ratio in this embodiment, in combination with the reduction ratio (2.4, for instance) given by the V-belt type continuously variable transmission and a reduction ratio given by the reduction gear mechanism 500.

Figure 2:
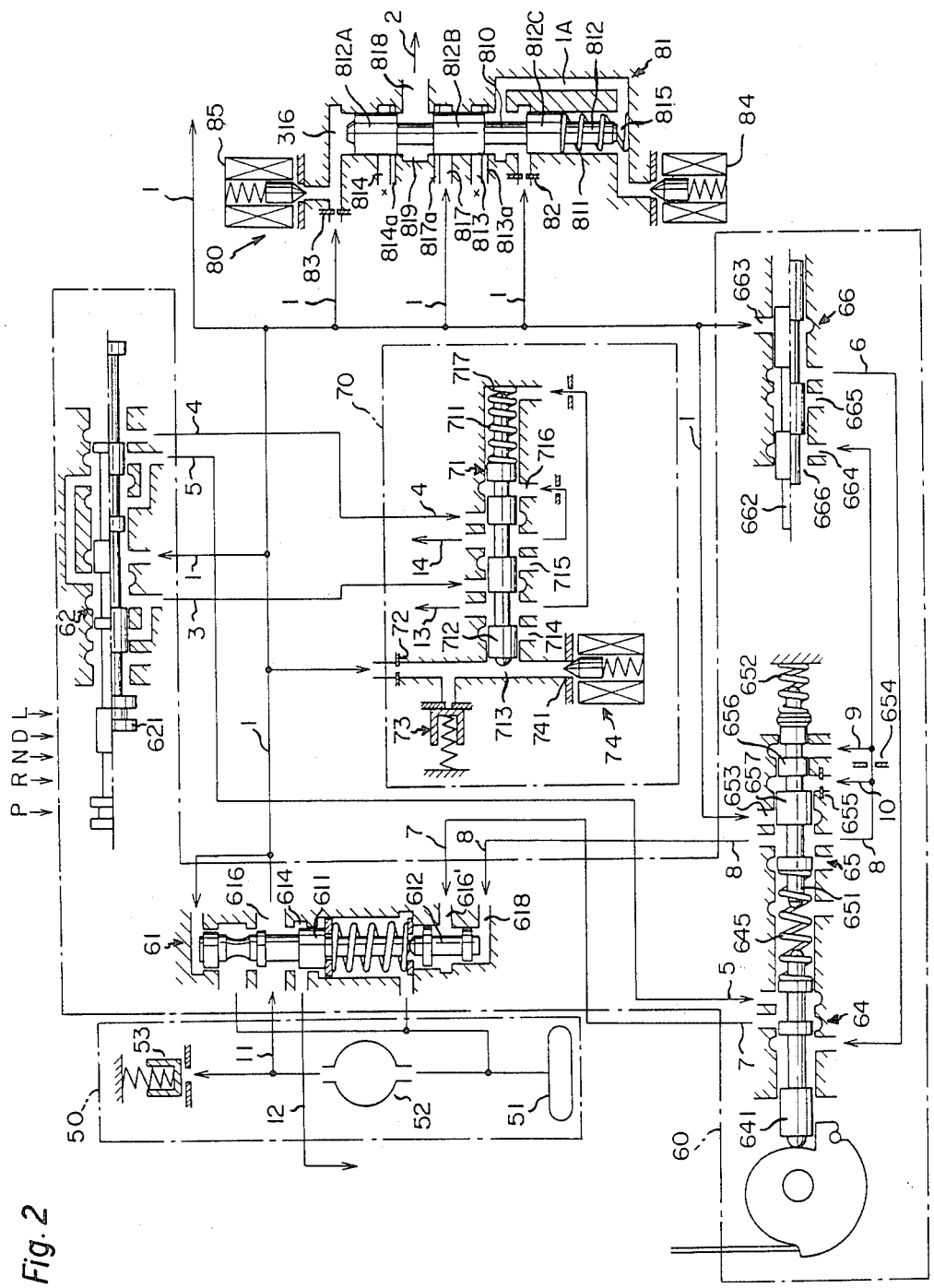
FIG. 2 is the hydraulic circuit diagram of the hydraulic control system of the continuously variable automatic transmission of FIG. 1.

FIG. 2 shows the hydraulic circuit of a hydraulic control system for controlling the continuously variable automatic transmission of FIG. 1.

The hydraulic control system comprises an oil pressure source 50, an oil pressure regulator 60, a shift control mechanism 70 for controlling the respective timing of engagement of the multiple disc brake and the multiple disc clutch of the planetary transmission 400 to relieve shocks resulting from shifting operation between N-gear and D-gear and between N-gear and R-gear, and a reduction ratio controlling mechanism 80 of the present invention. The oil pressure regulator 60 comprises a manual valve 62 which is manually operated by means of a shift lever, not shown, a detent valve 64 capable of providing a detent pressure corresponding to the degree of throttle opening $\theta$, a throttle valve 64 capable of providing a throttle pressure corresponding to the degree of throttle opening $\theta$, a torque ratio valve 66 interlocked with the movable flange 107 of the output pulley B for applying a line pressure corresponding to the displacement of the movable flange 107 to the detent valve 64 and at the same time for draining the output oil pressure feedback passage 9 of the throttle valve 65, and a regulator valve 61 for regulating the pressure of pressurized oil supplied from the oil pressure source 50 to line pressure and for distributing the line pressure to the components of the oil pressure regulator 60.

The oil pressure source 50 pumps up the hydraulic fluid through an oil strainer 51 by means of an oil pump 52 driven by the engine and supplies the hydraulic fluid to the regulator valve 61 through an oil passage 11 including a relief valve 53.

Figure 3:
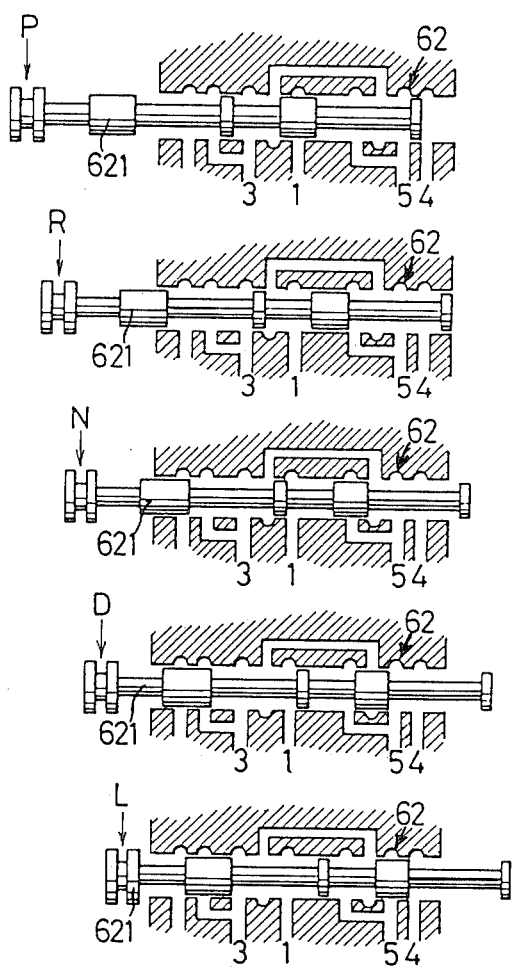
FIG. 3 is an explanetory representation illustrating the operating conditions of the manual valve.

The manual valve 62 has a spool 621 movable through five positions, namely, P(park), R(reverse), N(neutral), D(drive) and L(low) as shown in FIG. 3 corresponding to the shift positions P, R, N, D and L of the shift lever, whereby the output oil passages 3 to 5 are connected selectively to the oil passage 1 as tabulated in Table 1.

TABLE 1

|  | P | R | N | D | L |
|---|---|---|---|---|---|
| Oil passage 3 | x | x | x | o | o |
| Oil passage 4 | x | o | x | x | x |
| Oil passage 5 | x | o | x | x | o |

In Table 1, mark "o" represents the communication of the corresponding oil passage with the oil passage 1, while mark "x" represents separation of the corresponding oil passage from the oil passage 1.

The regulator valve 61 has a spool 611 and a regulator valve plunger 612 which is actuated by the detent pressure and the throttle pressure to control the spool 611. The area of a gap communicating with a second output port 614 varies with the displacement of the spool 611. The line pressure is supplied to the oil passage 1 through the output port 614. The pressurized oil is distributed to the fluid coupling, the oil cooler and lubricated parts from the second output port 614 through the oil passage 12.

The detent valve 64 has a spool 641 which moves in connection with the degree of throttle opening $\theta$ and is adapted to allow the oil passage 5 to communicate with a detent pressure output oil passage 7 connected to the input port 616 of the regulator valve 61 when $0 \leq \theta \leq \theta_1$ as shown in FIG. 4-A and to allow the oil passage 7 to communicate with an oil passage 6 connecting the detent valve 64 and the torque ratio valve 66 when $\theta_1 \leq \theta \leq 100\%$ as shown in FIG. 4B.

The throttle valve 65 has a spool 651 arranged in alignment with the spool 641 of the detent valve and connected to the spool 641 by a spring 645. A spring 652 biases the spool 651 toward the spool 641. The spool 651 is moved according to the variation of the degree of throttle opening $\theta$ so as to regulate the area of a port 653 connected to the oil passage 1 so that a throttle pressure is supplied to a throttle pressure output oil passage 8 connected to the input port 618 of the regulator valve 61. The output pressure is fed back to the throttle valve 65 through feedback oil passages 9 and 10 branched from the oil passage 8 and having orifices 654 and 655 respectively and is applied to the land 656 and the land 657 of the spool 65. The area of the land 657 is greater than that of the land 656.

The torque ratio valve 66 has a spool 662 linked with the movable flange 107 of the output pulley B by means of a connecting rod. The spool 662 is positioned on the left-hand side as shown in FIG. 5-A when the displacement L of the movable flange 107 is within a range defined by $l_3 \leq L \leq l_4$ (when torque ratio T is within a range defined by $t_2 \geq T \geq t_1$), whereby the input port 664 connected to the output pressure feedback oil passage 9 provided for the throttle valve 65 is closed and at the same time, the output oil passage 6 connected to the detent valve 64 is allowed to communicate with the drain port 665 to drain the oil passage 6. The spool 662 is positioned at an intermediate position as shown in FIG. 5-B when the displacement L of the movable falnge 107 is $l_2 \leq L \leq l_3 (t_3 \geq T \geq t_2)$ so that a port 664 connected to the oil passage 9 is allowed to communicate with a drain port 666 and hence the oil passage 9 is drained. The spool 662 is positioned on the right-hand side as shown in FIG. 5-C when the displacement L of the movable flange 107 is $0 \leq L \leq l_2 (t_4 \geq T \geq t_3)$ so that a port 663 connected to the oil passage 1 is allowed to communicate with the oil passage 6 and hence the line pressure is supplied to the oil passage 6.

Although the spool 662 is in sliding contact with the movable flange 107 of the rotating output pulley B, the spool 662 will not hinder the movement of the movable flange 107 and the wear of the slide surface of the spool which is in sliding contact with the movable flange 107 at a high relative speed is prevented as neither a spring nor oil pressure which will hinder the axial movement of the spool 662 is provided.

The shift control mechanism 70 comprises a control valve 71 provided with a spool 712 biased at one end thereof with a spring 711 and receiving on the other end thereof the line pressure applied to an oil chamber 713, an orifice 72 provided in the oil passage 1 for supplying the line pressure to the oil chamber 713, a pressure limiting valve 73 disposed between the orifice 72 and the oil chamber 713 and an electromagnetic valve 74 which is controlled by an electric control circuit, which will be described below, to regulate the oil pressure prevailing within the oil chamber 713. While the electromagnetic valve 74 is actuated to open the drain port 741 and to drain the oil chamber 713, the spool 712 of the shift control valve 71 is moved left, in the drawing, by the action of the spring 711 so that an oil passage 13 connected to the hydraulic servomechanism 402 for operating the multiple disc clutch 401 of the planetary transmission 400 and an oil passage 14 connected to the hydraulic servomechanism 409 for operating the multiple disc brake 407 of the planetary transmission 400 are connected to drain ports 714 and 715 respectively whereby the oil passages 13 and 14 are drained and hence the multiple disc clutch 401 is disengaged or the multiple disc brake 407 is released. The drain port 741 is closed while the electromagnetic valve 74 is not actuated, therefore, the spool 712 is moved right by the agency of the line pressure supplied into the oil chamber 713 so that the oil passages 3 and 4 communicate with the oil passages 13 and 14 respectively and hence the multiple disc brake 407 or the multiple disc clutch 401 is caused to engage. In this embodiment, the shift control valve 71 is provided with oil chambers 717 and 716 to which the respective output pressures of the oil passages 13 and 14, respectively, are fed back to relieve the respective rising rates of the output pressures in order to prevent shocks resulting from the engagement of the multiple disc clutch 401 and the multiple disc brake 407.

The reduction ratio controlling mechanism 80 comprises a reduction ratio control valve 81, orifices 82 and 83, up-shift electromagnetic valve 84 and a down-shift electromagnetic valve 85. The reduction ratio control valve 81 comprises a spool 812 having a first land 812A, a second land 812B and a third land 812C and being biased by a spring 811 acting on the third land 812C, end oil chambers 815 and 816 receiving the line pressure from the oil passage 1 through the orifices 82 and 83 respectively, a middle oil chamber 810 formed between the land 812B and 812C, an oil passage 1A connecting the oil chamber 815 and the middle oil chamber 810, a oil pressure regulating chamber 819 communicating with the oil passage 1 for disturbing the line pressure and having an input port 817, the area of which varies with the movement of the spool 812, and an output port 818 communicating with the hydraulic servomechanism C of the input pulley A through the oil passage 2, a drain port 814 for draining the oil pressure regulating chamber 819 according to the movement of the spool 812, a drain port 813 for draining the oil chamber 810 according to the movement of the spool 812. The up-shift electromagnetic valve 84 and the down-shift electromagnetic valve 85 are provided in the oil chambers 815 and 816, respectively, of the reduction ratio control valve 81, for draining the oil chambers 815 and 810 and the oil chamber 816, respectively, under the control of an electric control circuit, which will be described hereinafter.

Figure 6:
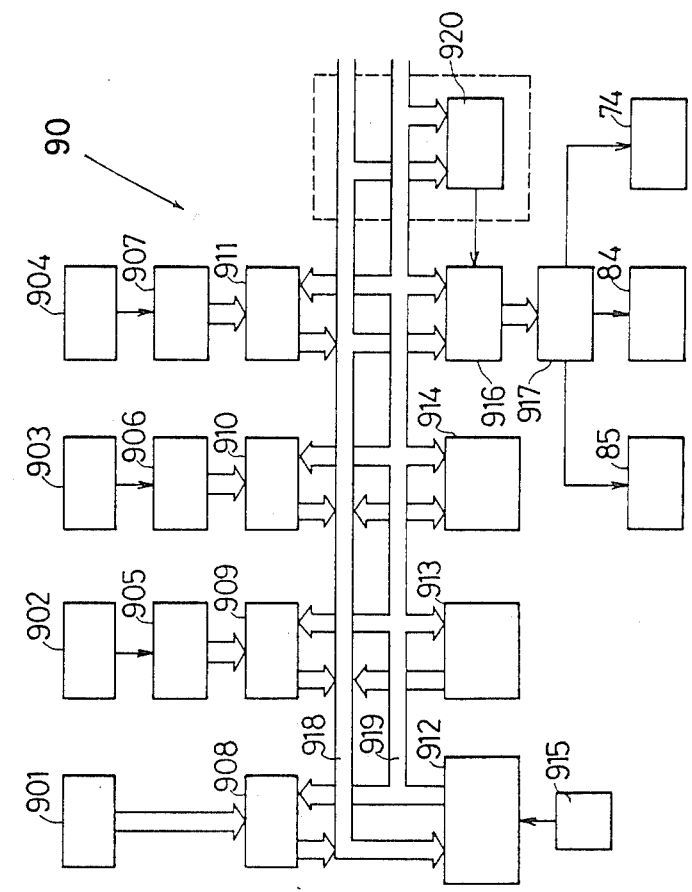
FIG. 6 is a block diagram of the electric control circuit.

FIG. 6 shows the block diagram of an electric control circuit for controlling the electromagnetic valve 74 of the shift control mechanism 70, the up-shift electromagnetic valve 84 and the down-shift electromagnetic valve 85 of the reduction ratio controlling mechanism 80 all of the hydraulic control system shown in FIG. 2.

Referring to FIG. 6, there are shown a shift lever switch 901 for detecting the position, namely, P, R, N, D or L, of the shift lever, a revolving rate sensor 902 for detecting the revolving rate of the input pulley A, a running speed sensor 903, a throttle sensor 904 for detecting the degree of throttle opening, a revolving rate signal processing circuit 905 for converting the output signal of the revolving rate sensor 902 into a voltage signal, a running speed detecting circuit 906 for converting the output signal of the running speed sensor 903 into a voltage signal, a throttle opening detection signal processing circuit 907 for converting the output signal of the throttle sensor 904 into a voltage signal, input interfaces 908 to 911 for the sensors, a central processing unit (CPU) 912, a read-only memory (ROM) 913 for storing data and program which are necessary to control the electromagnetic valves 74, 84 and 85, a random access memory (RAM) 914 for temporarily storing the input data and parameters necessary for control operations, a clock 915, an output interface 916 and a solenoid output driver 917 capable of converting the output signal of the output interface 916 into operating outputs for the down-shift electromagnetic valve 85, the up-shift electromagnetic valve 84 and the shift control solenoid 74. A data bus 918 and an address bus 919 connect the input interfaces 908 to 911 and the CPU 912, ROM 913, RAM 914 and the output interface 916.

The manner of operation of the oil pressure regulator 60 of the present invention comprising the torque ratio valve 66, the detent valve 64, the throttle valve 65, the manual valve 62 and the regulator valve 61 will be described hereinafter.

The hydraulic fluid is supplied to the oil pressure control circuit by means of a pump 52 driven by the engine. Higher line pressure results in increased power consumption of the pump 52. Accordingly, it is necessary to reduce the line pressure for the oil pressure control circuit to the lowest possible level to attain reduced fuel consumption. In the continuously variable transmission, the line pressure is selectively determined to make the hydraulic servomechanisms of the input pulley A and the output pulley B function to provide slipless power transmission by the V-belt 112 between the input and output pulleys. The least necessary line pressure corresponding to the variation of the torque ratio T between the input and output pulleys when the engine is operated at the optimum fuel consumption is shown for the degree of throttle opening $\theta$ as a parameter with continuously lines in FIG. 7. Since it is impossible to operate the engine at an optimum fuel consumption rate for the capacity of torque ratio of those pulleys, it is desirable to provide line pressure shown by broken lines which are higher than the characteristic curves for optimum fuel consumption shown by continuous lines by approximately 20%. In applying engine brake, it is desirable to provide a line pressure characteristic higher than the curve shown by an alternate long and short dash lines even when the degree of throttle opening $\theta = 0$.

In this embodiment, the line pressure provided by the regulator valve 61 is regulated as described hereinafter by the oil pressure regulator 60 corresponding to the shift position (L, D, N, R, P) of the manual valve 62, the degree of throttle opening $\theta$ and the torque ratio between the input and output pulleys (torque ratio between the input and output shafts).

Position D

In the manual valve 62, only the oil passage 3 communicates with the oil passage 1, while the oil passages 4 and 5 are drained. If the shift control electromagnetic valve 74 of the shift control mechanism 70 is closed and the line pressure is applied to the oil chamber 713, the spool 712 is moved to the right-hand position, whereby the oil passage 3 is allowed to communicate with the oil passage 13 and hence the line pressure is applied from the oil passage 3 to the hydraulic servomechanism 402 of the multiple disc clutch 401 for forward drive through the oil passage 13. Consequently, the vehicle is put in readiness for forward running.

$$t_1 \leq T \leq t_2 \tag{1}$$

Figure 8:
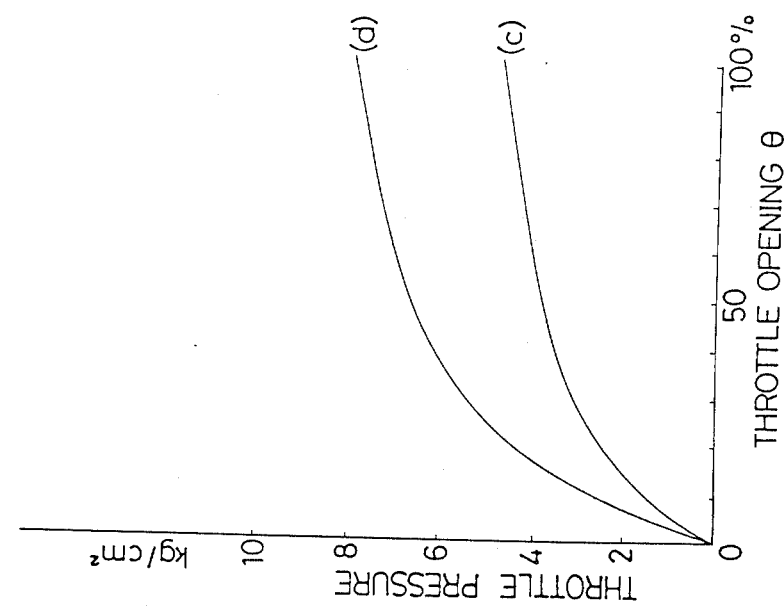
FIG. 8 is a graphical representation of the characteristics of the throttle pressure.

When the torque ratio T is within this range, the port 663 of the torque ratio valve 66 connected to the oil passage 1 is closed and the oil passage 6 is drained through the drain port 665 as shown in FIG. 5-A. Consequently, the detent pressure, which is equivalent to the line pressure, is not produced within the oil passage 7 irrespective of the degree of throttle opening $\theta$. In the throttle valve 65, since the port 664 of the torque ratio valve connected to the oil passage 9 is closed and the feedback pressure is applied to the land 656 and 657 of the spool 651, the throttle valve 65 provides throttle pressure of a characteristic as shown by a curve indicated at c in FIG. 8 with the variation of the degree of throttle opening $\theta$, which throttle pressure is applied to the regulator valve plunger 612 of the regulator valve 61 through the oil passage 8. Consequently, the line pressure varies as shown by a curve f of FIG. 9 and a curve e of FIG. 10.

$$t_2 < T \leq t_3 \tag{2}$$

The port 663 of the torque ratio valve 66 is closed and the oil passage 9 is communicating with the drain port 666 as shown in FIG. 5-B. The oil passage 6 is drained through the port 665. Accordingly, no detent pressure is produced and the throttle pressure is increased by an increment corresponding to the cancellation of the feedback pressure acting on the land 657 of the spool 651 resulting from draining of the oil passage 9 and varies as shown by a curve d of FIG. 8. In this state, the line pressure varies as shown by a curve k of FIG. 9 and a curve g of FIG. 10.

$$t_3 < T \leq t_4 \tag{3}$$

The oil passage 9 is drained through the drain port 666 as shown in FIG. 5-C. Consequently, the throttle pressure varies as shown by a curve d of FIG. 8 similarly to the variation of the throttle pressure under the torque ratio condition (2). However, since the port 663 is opened to for the oil passage 1 to communicate with the oil passage 6, the oil passage 6 is closed with the spool 641 and the oil passage is drained through the oil passage 5 and the manual valve 62, while the degree of throttle opening is $0 \leq \theta \leq \theta\%$ and the spool 641 of the detent valve 64 is on the left-hand side as shown in FIG. 4-A, whereas the spool 641 is moved to a position as shown in FIG. 4-B when the degree of throttle opening is $\theta\% < 0 \leq 100\%$ allowing the oil passage 6 to communicate with the oil passage 7 so that the detent pressure is produced within the coil passage 7. Consequently, the line pressure varies in a curve l of FIG. 9 and a curve i or FIG. 10 each stepping at $\theta = \theta_1\%$.

Position L

In the manual valve 62, the oil passage 5 is allowed to communicate with the oil passage 1, while the passages 3 and 4 are in the same state as when the manual valve is placed in Position D.

$$t_1 \leq T \leq t_2 \tag{1}$$

Figure 11:
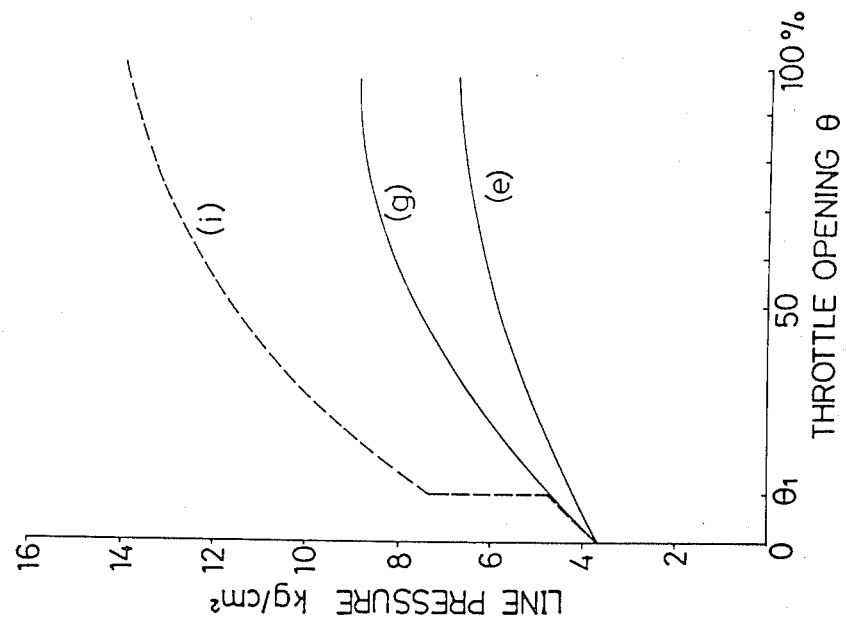

The oil passages 5 and 7 communicates by means of the detent valve 64 while the degree of throttle opening is $0 \leq \theta \leq \theta_1\%$ so that the detent pressure is applied to the regulation valve plunger 612 and hence a high line pressure is produced. While the degree of throttle opening is $\theta_1\% < 0 \leq 100\%$, the oil passage 7 is drained through the oil passage 6 and the drain port 665 of the torque ratio valve as shown in FIG. 5-A so that no detent pressure is produced. The throttle pressure varies in the same mode as in the case of Position D. Consequently, the line pressure varies as shown by a curve k of FIG. 11.

$$t_2 < T \leq t_3 \tag{2}$$

The condition of (2) is different from that of (1) in that the oil passage 9 is drained through the drain port 666 of the torque ratio valve 66 and an increased line pressure is supplied from the throttle valve 65 to the regulator valve 61 through the oil passage 8. Thus the line pressure varies as shown by a curve h of FIG. 11.

$$t_3 < T \leq t_4 \qquad (3)$$

The oil passages 6 and 1 are connected at the torque ratio valve 66, while the oil passage 9 is drained through the drain port 666. Since the line pressure is applied to both oil passages 5 and 6, the detent valve 64 produces a detent pressure irrespective of the degree of throttle opening. The regulator valve 61 provides a line pressure varying as shown by a curve j of FIG. 11 upon reception of the detent pressure and the throttle pressure varying in the same mode as in the case of (2).

Position R

As shown in Table 1, the oil passages 4 and 5 communicate with the oil passage 1 by means of the manual valve 62, while the oil passage is drained. In this state, the spool 712 is positioned on the right-hand side whereby the oil passage 4 is allowed to communicate with the oil passage 14 so that the line pressure supplied to the oil passage 4 is supplied to the hydraulic servomechanism 409 of the multiple disc brake 407 for reverse driving through the oil passage 14 and hence the vehicle is put in readiness for reverse running, when the shift control electromagnetic valve 74 of the shift control mechanism 70 is closed and the line pressure is applied to the oil chamber 713. Since the line pressure is introduced into the oil passage 5, the line pressure varies in the same mode as in the case of Position L. When the manual valve is placed in Position R, the V-belt type continuously variable transmission 200 is in the maximum torque ratio $t_4$, therefore, no speed change (reduction) is necessary in the planetary transmission 400, however, even when the torque ratio T is varied in Position R, the line pressure is controllable in the same manner as in the case of Position L, in this embodiment.

Position P and Position N

Since the oil passages 3, 4 and 5 are drained at the manual valve 62, the regulator valve 61 provides the same line pressure as in the case of Position D.

Figure 7:
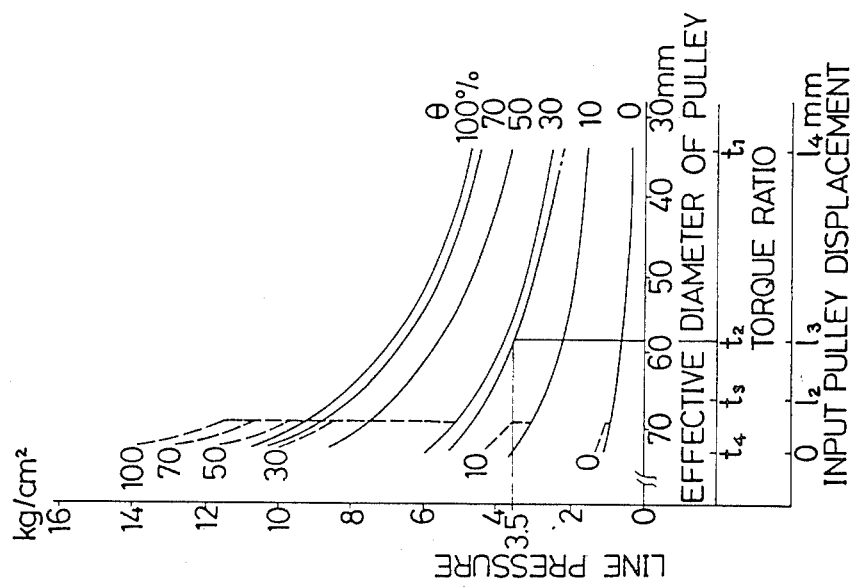
FIG. 7 is a graphical representation of the characteristics of the line pressure necessary for the hydraulic control system.
Figure 9:
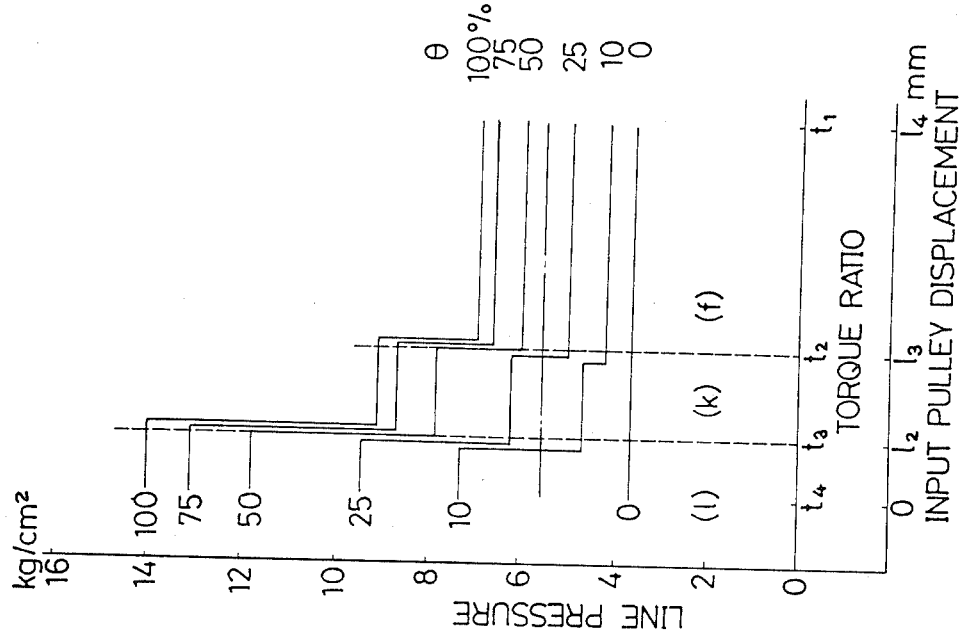
FIGS. 9, 10 and 11 are graphical representations of the characteristics of the line pressure regulated by the oil-pressure regulating system.
Figure 10:
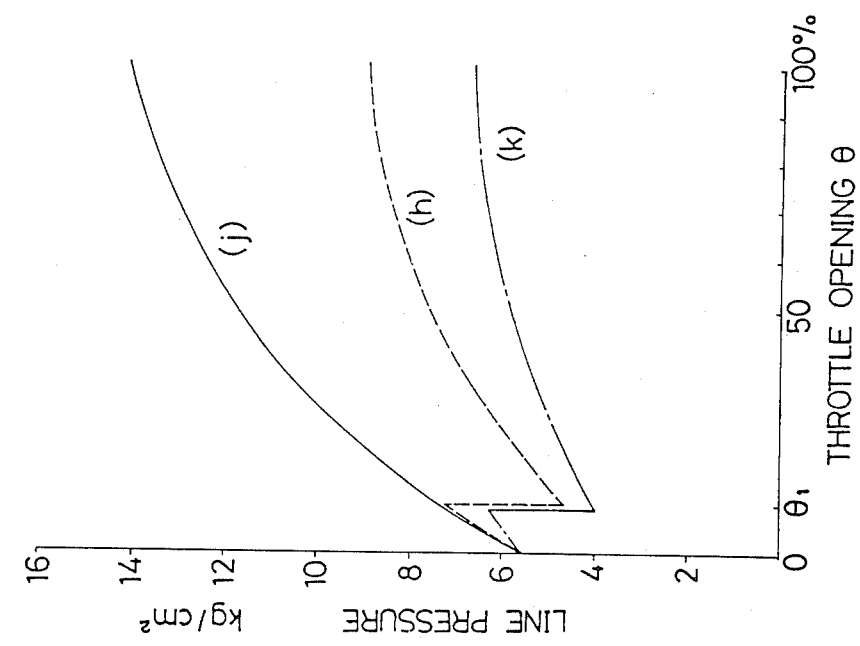

When the manual valve 62 is placed in Position D, Position N or Position P, the line pressure is set at a low value as shown by a curve i of FIG. 10 for the degree of throttle opening $\theta$ below a degree of throttle opening $\theta_1\%$, when the torque ratio is $t_3 < T \leq t_4$. If the line pressure is set at a high valve in an operating state, such as idling of the engine, in which the degree of throttle opening is small and the discharge rate of the pump is small, maintaining the line pressure is difficult if the temperature of the hydraulic fluid is high and increased leakage occurs at various parts of the hydraulic circuit and the malfunction of the entire system is liable to occur resulting from the further increase in the temperature of the hydraulic fluid due to reduction of the quantity of the hydraulic fluid circulating through the oil cooler. Since comparatively high oil pressure is required for applying engine brake even at a low degree of throttle opening, the line pressure is set at a high value for the torque ratio $t_1 \leq T \leq t_2$ and the degree of throttle opening $\theta$ below $\theta_1\%$ as shown by curves h and k of FIG. 11 when the manual valve 62 is placed in the Position L and Position R. Alternate long and short dash lines in FIG. 7 show the variation of the oil pressure for such a requirement. Allowing the oil pressure to be set at a value near the minimum necessary value of FIG. 7 as shown in FIG. 9 reduces power consumption by the pump 52, therefore, the fuel consumption and the fuel consumption rate are improved.

The operation of the electric control circuit 90, the shift control mechanism 70 controlled by the electric control circuit 90 and the reduction ratio controlling mechanism 80 of the present invention will be described hereinafter referring to program flowcharts shown in FIGS. 18 to 26.

In this embodiment, the revolving rate N of the input pulley is controlled by the electric control circuit 90 to provide optimum fuel consumption for every degree of throttle opening.

Figure 16:
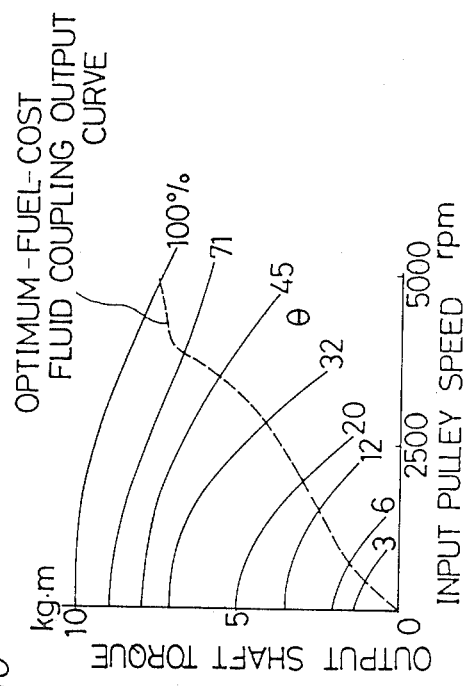
FIG. 16 is a graphical representation of the output of a fluid coupling for the optimum fuel consumption.
Figure 17:
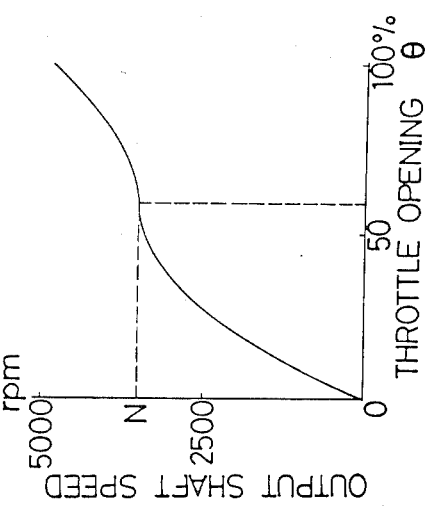
FIG. 17 is the characteristics of the output revolving rate of a fluid coupling for the optimum fuel consumption.

Fuel consumption is optimized when the engine is operated according to an optimum fuel consumption power curve by a broken line in FIG. 12. In FIG. 12, the axis of abscissa and the axis of ordinate represent engine speed (rmp) and the torque (kg.m) of the output shaft of the engine respectively. The optimum fuel consumption power curve is determined in the following manner. The equivalent fuel consumption rate curves (g/PS.hr) shown by alternate long an two short dashes lines in FIG. 12 provide a fuel consumption (g/hr) at point A $$S = Q \times P \text{ (g/hr)}$$

where Q is the fuel consumption rate (g/PS.hr) at point A and P is the power (PS) at point A. Determining fuel consumption per hour S for all the points on each equivalent power curve gives the minimum value of S for each equivalent power curve. Connecting the minimum value of S for all the equivalent power curves provides the optimum fuel consumption power curve showing the operating condition of the engine at the optimum fuel consumption. When the engine is combined with a fluid coupling 21 as in the present embodiment, an optimum fuel consumption fluid coupling output curve is determined on the fluid coupling output performance curves as shown in FIG. 16 in the same manner as described immediately above from the engine output performance curves for various degrees of throttle opening $\theta$ of FIG. 13, the fluid coupling performance curves of FIG. 14 and the engine equivalent fuel consumption rate curve of FIG. 15. FIG. 17 shows the relationship between the degree of throttle opening and the output shaft speed of the fluid coupling, derived from the optimum fuel consumption fluid coupling output curve of FIG. 16. The output shaft speed of the fluid coupling corresponds directly to the revolving rate of the input pulley in the continuously variable transmission of the present embodiment.

In the continuously variable transmission of the present embodiment, the speed change ratio (reduction ratio) between the input pulley A and the output pulley B is controlled on the basis of the optimum fuel consumption input pulley speed thus obtained and the detected actual input pulley speed.

Figure 18:
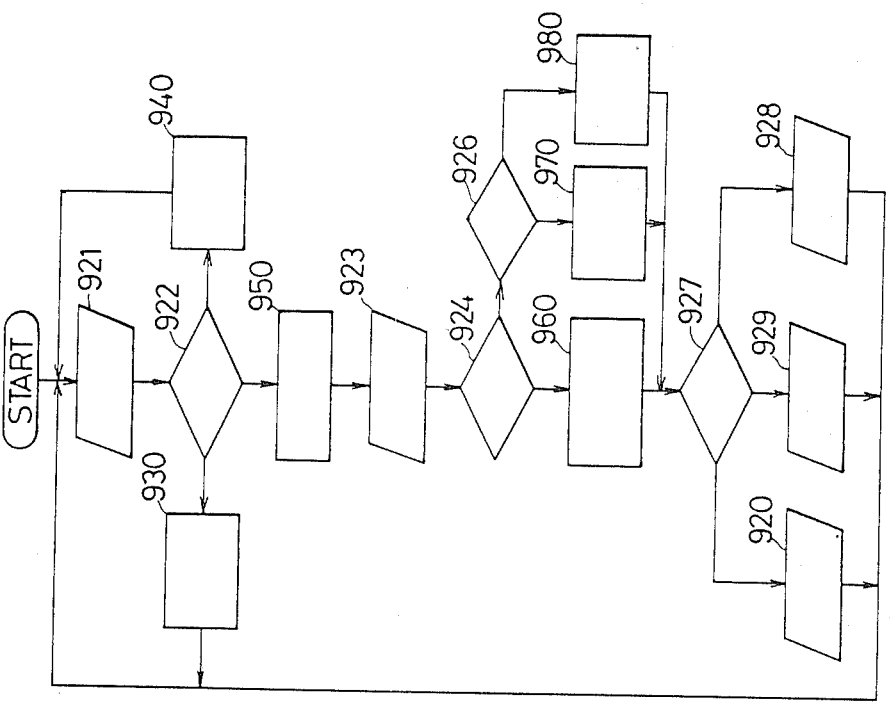
FIGS. 18, 19, 22 to 24 and 26 are program flowcharts of the electric control circuit.

The reduction ratio between the input and the output pulleys is controlled through the operation of two electromagnetic valves 84 and 85 of the reduction ratio controlling mechanism 80 so as to make the actual revolving rate of the input pulley coincide with the optimum fuel consumption input pulley revolving rate through the comparsion of the actual revolving rate of the input pulley with the optimum fuel consumption input pulley revolving rate of FIG. 17. FIG. 18 shows a general program flowchart for controlling the revolving rate of the input pulley.

Figure 20:
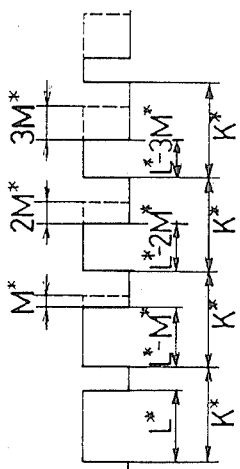
FIG. 20 is a waveform chart for facilitating the explanation of duty ratio.
Figure 23:
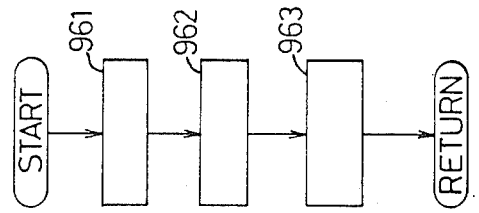
Figure 19:
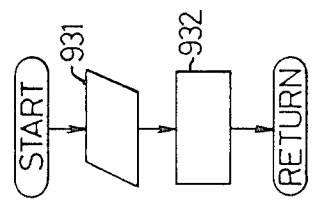
Figure 21:
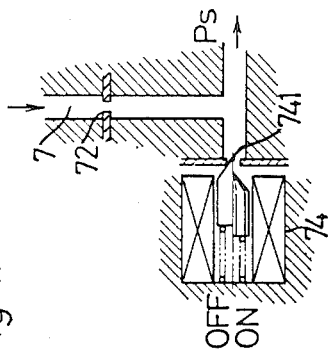
FIG. 21 is an explanatory representation of the operation of the shift controlling electromagnetic valve.

After the degree of throttle opening $\theta$ has been read (921) by the throttle sensor 904, the position of the shift lever is discriminated (922) by means of the shift lever switch 901. When the shift lever is placed in Position P or Position N, both electromagnetic valves 84 and 85 are closed (931) according to a Position P and Position N processing subroutine (930) and the Position P or Position N is memorized in RAM 914 (932). Thus the input pulley A is placed in neutral state. When the shift lever is shifted from Position N or Position P to Position R and when shifted from Position N to Position D, shifting shock control processings (940) and (950) are effected in order to relieve shocks resulting from N-R or N-D shifting. As shown in FIG. 20, the shifting shock control is represented by a diagram having a cycle K* and varying pulse width determined by L*2−nM* (n=1, 2, 3,...). Pulse signals or progressively decreasing pulse width are applied to the shift control electromagnetic valve 74 of the shift control mechanism 70 (such a control will be referred to as "duty control" hereinafter). Duty control of the shift control electromagnetic valve 74 provides an oil pressure ps corresponding to the duty control for the oil chamber 713 of the shift control valve 71.

The shift control mechanism 70 regulates the timing of applying an oil pressure to and draining the hydraulic servomechanism 402 and 409 of the planetary transmission 400 by the agency of the electromagnetic valve 74 controlled by the output signals of the electric control circuit 90 to relieve shocks resulting from shifting operation and at the same time suppresses the upper limit of the oil pressure applied to the hydraulic servomechanisms 402 and 409 below a set value by the agency of the pressure limiting valve 73 to limit the respective pressure of engagement of the clutch and the brake.

Oil pressures Pc and Pb applied to the hydraulic servomechanism 402 of the multiple disc clutch 401 which is engaged for forward drive and to the hydraulic servomechanism 409 of the multiple disc brake 407 which is engaged for reverse drive, respectively, are given on the basis of the oil pressure equilibrium equations (1) and (2) of the shift control valve 71 as follows:

Forward drive: $Ps \times S_1 = Pc \times S_2 + Fs_1$ (1)

$$Pc = \frac{S_1}{S_2} Ps - \frac{Fs_1}{S_2}$$

Reverse drive: $Ps \times S_1 = Pb \times (S_1 - S_2) + Fs_1$ (2)

$$Pb = \frac{S_1}{S_1 - S_2} Ps - \frac{Fs_1}{S_1 - S_2}$$

where $S_1$, $S_1$, $S_1$ and $S_2$ are the areas of lands formed from left to right in the spool 712 of the shift control valve 71 (FIG. 28), Fs is the resilient force of the spring 711 and Ps is the oil pressure working in the oil chamber 713.

The pressure limiting valve 73 operates at the maximum pressure P limit corresponding to the maximum value of Ps which is defined by the following oil pressure equilibrium equation:

$$P \text{ limit} \times S_3 = Fs_2 \quad (3)$$

therefore, $$P \text{ limit} = Fs_1/S_3$$

where $S_3$ is the area of the pressure receiving surface of the valve element 731 of the pressure limiting valve 73 and Fs is the resilient force of the spring 732 biasing the valve element 731.

The maximum values Pc limit and Pb limit of Pc and Pb are limited by the following equations;

Forward drive: $Pc \text{ limit} = \frac{S_1}{S_2} P \text{ limit} - \frac{Fs_1}{S_2}$ (4)

Reverse drive: $Pb \text{ limit} = \frac{S_1}{S_1 - S_2} P \text{ limit} - \frac{Fs_1}{S_1 - S_2}$ (5)

Figure 22:
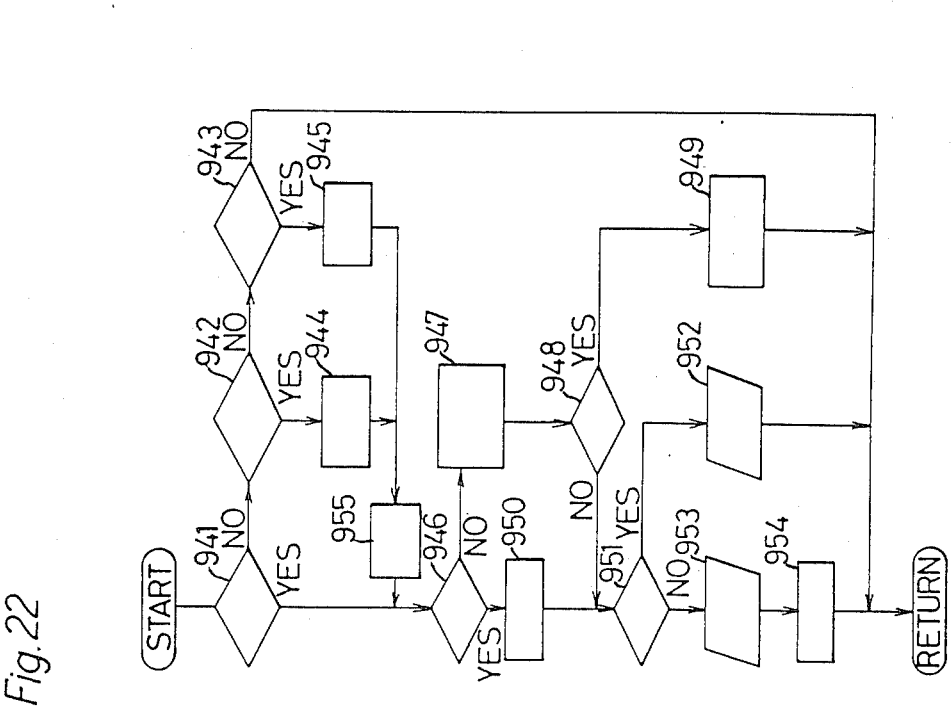

FIG. 22 shows a program flowchart of the shock control process employing the parameter K*, L* and M* of the waveform diagram of FIG. 20. Flag decision (941) of continuation or interruption of the shock control process is made and the process is continued if the shock control process is under operation. If the process is interrupted, decision (942) of whether shift from Position P or N to Position R is made and decision (943) of whether shift from Position N to Position D is made in the shift lever switch 901. When either one of the shifts is made, setting (944) or setting (45) of the parameters K*, L* and M* is made corresponding to the shift made and a shift control process continuation flag is set (955). When neither shift is made, the process is returned and the shift control process is not effected. When the shock control process is continued, decision (946) of whether a parameter K for deciding the end of a cycle k* of the controlling operation is positive or not is made. When K is not positive, K, L* and L are set (947) at K*, L*−M* and L* respectively, and decision (948) of whether L is zero or below or not is made. If L is zero or below, FLAG OFF(949) is made and the process is returned. In this case, L≦0 and "FLAG OFF" means the completion of the entire shift shock control process. When K is positive in the decision (946), K−1 is set (950) at K and decision (951) of whether the parameter L, which decides the completion of the duration of a cycle K, is zero or not is made. The same decision (951) is made when L>0 is decided (948). When L=0, a command (952) to close the electromagnetic valve 74 is provided. when L is a value other than zero, L−1 is set (954) at L and the process is returned after a command (953) to close the electromagnetic valve 74 has been provided. A programmable timer indicated at 920 in FIG. 6 also is applicable to the same shift shock control process.

The actual revolving rate N of the input pulley is read (923) by means of the input pulley revolving rate sensor 902 following the N-D shift shock control process (950). Then, decision (924) of whether the degree of throttle opening $\theta$ is zero or not is made. If $\theta$ is not zero, storage address for the data of input pulley revolving rate N* corresponding to the degree of throttle opening is set (961) in order to set (960) the optimum fuel consumption input pulley revolving rate N* corresponding to the degree of throttle opening $\theta$ of FIG. 17 which has previously be stored in the ROM 913, according to a subroutine shown in FIG. 23. The data of N* read (962)

from the set address is stored temporarily (963) in the data storage RAM 914.

Figure 25:
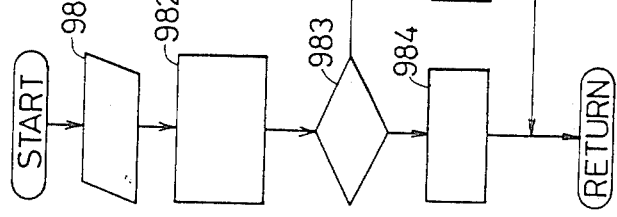
FIG. 25 is a graphical representation of set acceleration.
Figure 24:
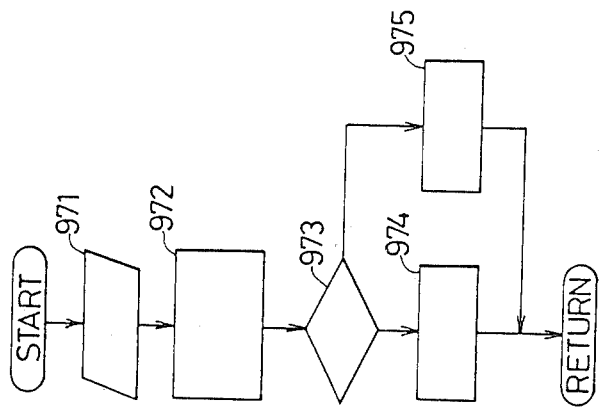

Then, actual input pulley revolving rate N and the optimum fuel sunsumption input pulley revolving rate N* are compared (927) with each other. When N<N*, a command (928) for actuating the up-shift electromagnetic valve 84 is provided. When N>N*, a command (929) for actuating the electromagnetic valve 85 is provided. When N=0, a command (920) for closing both electromagnetic valves 84 and 85 is provided. When θ=0, namely, when the throttle is closed, decision (926) is made to decide whether the shift lever is placed in Position D or the shift lever is placed in Position L in order to decide if the application of engine brake is necessary or not. Engine brake control (970) or (980) is effected as occasion demands. The engine brake application process (970) for Position D is performed as shown in FIG. 24. The running speed V is read (971) by means of the running speed sensor 903 and at the same time the acceleration α is calculated (972), decision (973) of whether the calculated acceleration α is an acceleration A which is appropriate to the running speed or not is made. When α>A, the process is returned after setting N* at a value greater than N to perform down-shift control (974). When α≦A, the process is returned after setting (975) N* at an optimum fuel consumption input pulley revolving rate N*. The relationship between the running speed and the appropriate acceleration A is determined experimentally of theoretically for individual vehicles, which is shown in FIG. 25.

Figure 27:
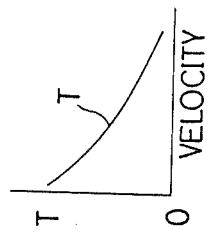
FIG. 27 is a graphical representation of set torque ratio.
Figure 26:
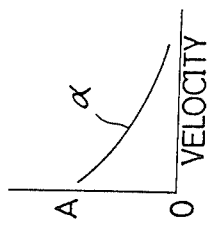

The engine brake application process (980) for Position L is performed as shown in FIG. 26. After reading (981) the running speed V, the torque ratio T is calculated (982) on the basis of the running speed V and the input pulley revolving rate N using the following equation.

$$T = N/V \times k$$

where k is a constant determined by the reduction ratio of the internal reduction gear mechanism 500 of the transmission, the final reduction ratio of the driving system of the vehicle and the radius of the tire. Next, decision (983) of whether the operating torque ratio T is greater than a torque ratio T* capable of allowing safe and appropriate engine brake against the running speed V or not is made. When T≧T*, N* is set (985) at a value equivalent to N and the process is returned. When T<T*, N* is set (984) at a value greater than N so that down-shift operation is performed. Torque ratio T* capable of allowing safe and appropriate application of engine brake is determined experimentally or theoretically for every running speed, which is shown in FIG. 27.

The shift control mechanism 70 regulates the timing of operation of the hydraulic servomechanisms 402 and 409 of the planetary transmission 400 by the agency of the electromagnetic valve 74 which is controlled by the output signal of the electric control circuit 90, in order to relieve shocks resulting from shifting operation and at the same time suppresses the upper limit of the oil pressure applied to the servomechanisms 402 and 409 below a set value by the agency of the pressure limiting valve 73, to limit the pressure of engagement of the clutch and the brake.

In order to relieve shocks resulting from N-D and N-R shifting operations, the rising rate of the oil pressure Pc for the hydraulic servomechanism 402 or the oil pressure Pb for the hydraulic servemechanism 409 is controlled according to the oil pressure characteristic curve shown in FIG. 29. The engagement of the multiple disc clutch 401 or the multiple disc brake 407 is completed within a range between A and C in FIG. 29. FIG. 30 shows the relationship between the duty (%) of the electromagnetic valve 74 for controlling the oil pressure applied to the hydraulic servomechanism 402 or 409 and the solenoid pressure Ps produced within the oil chamber 713 due to the operation of the electromagnetic valve 74. The duty (%) is represented by the following equation, $$\text{Duty} = \frac{\text{Time of duration of solenoid actuation in one cycle}}{\text{Solenoid actuating cycle}} \times 100\ (\%)$$

The solenoid pressure shown in FIG. 30 is amplified by the agency of the shift control valve 71 to provide the oil pressure Pc applied to the hydraulic servomechanism 402 or the oil pressure Pb applied to the hydraulic servomechanism 409 shown in FIG. 31.

The function of the reduction ratio controlling mechanism 80 of the present invention will be described hereinfter according to FIG. 32.

Constant Speed Running

Figure 32A:
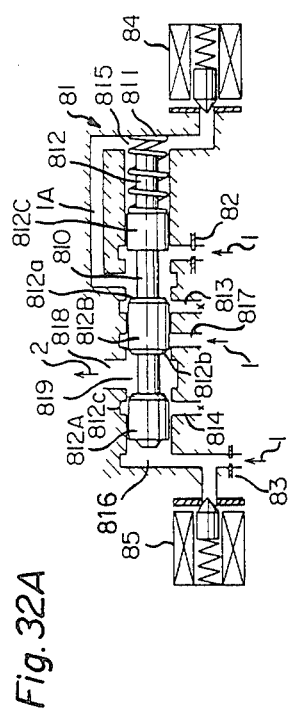
FIGS. 32-A, -B and -C are representations illustrating the operating conditions of the reduction ratio control mechanism according to the present invention.
Figure 32B:
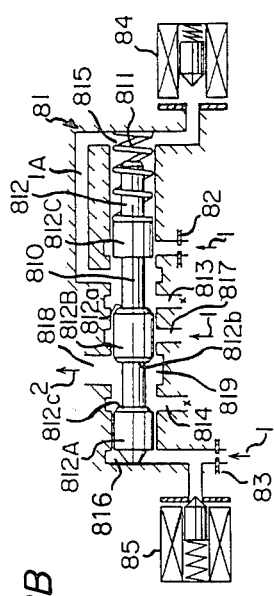
Figure 32C:
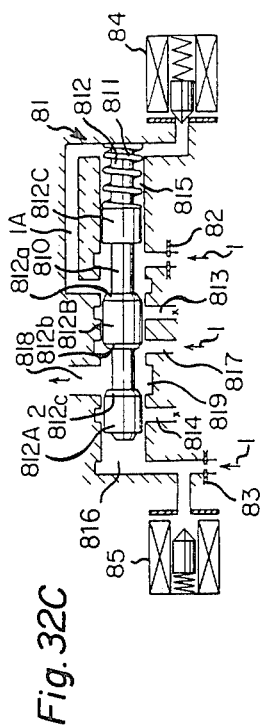
Figure 35:
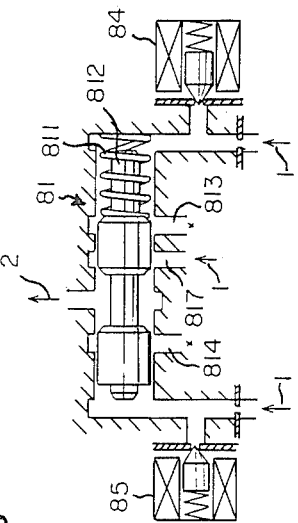
FIG. 35 is a representation of the constitution of a reduction ratio control mechanism embodying the present invention.

The electromagnetic valves 84 and 85, which are controlled by the output signals of the electric control circuit 90, are closed as shown in FIG. 32-A. Therefore, the pressure $P_1$ within the oil chamber 816 becomes equivalent to the line pressure, while the pressure $P_2$ within the oil chamber 815 becomes equivalent to the line pressure when the spool 812 is positioned on the right. The spool 812 is biased to the left by a pressure $P_3$ resulting from the spring load of a spring 811. When the spool 812 is moved to the left, the oil chamber 815 communicates with the drain port 813 through the oil passage 1A and the oil chamber 810, therefore, the spool 812 is moved to the right by the oil pressure P prevailing within the oil chamber 816. The movement of the spool 812 to the right closes the drain port 813. Accordingly, forming a flat plane (taper surface) 812a along the edge of the land 812B of the spool 812 on the side facing the drain port 813 makes possible to keep the spool 812 at an intermediate equilibrated position as shown in FIG. 32-A with increased stability.

While the spool 812 is kept at the intermediate equilibrated position as shown in FIG. 32-A, the oil passage 2 is interrupted. Therefore, the hydraulic servomechanism C of the input pulley A is compressed by the agency of the line pressure applied to the hydraulic servomechanism D of the output pulley B through the V-belt 112 and hence the oil pressure within the hydraulic servomechanism C is equilibrated finally with the oil pressure applied to the servomechanism E. Practically, since oil leakage occurs in the oil passage 2, the input pulley A is expanded gradually so that the torque ratio T tends to increase. In order to compensate the oil leakage from the oil passage 2, a flat surface (a taper surface) 812b is formed along the edge of the land 812B of the spool 812 on the side facing the port 817 so that the drain port 814 is closed while the oil passage 1 is opened slightly into the oil chamber when the spool 812 is positioned at the equilibrated position as shown in FIG. 32-A. Furthermore, forming a flat surface (a taper surface) 812c along the edge of the land 812A on the side facing the drain port 814 allows smooth variation of oil pressure, such as rise-up variation, in the oil passage 2. In this case, the leakage of the hydraulic fluid of the line pressure occurs only through a single part, namely, from the drain port 813 through the orifice 82.

Up-Shift

The up-shift electromagnetic valve 84 is opened by the output signal of the electric control circuit 90 as shown in FIG. 32-C, and then since the oil chamber 815 is drained, the spool 812 is moved to the right-hand end to compress the spring 811.

In this state, since the line pressure is supplied from the oil passage 1 to the oil passage 2 through the port 818, the oil pressure within the hydraulic servomechanism D increases and hence the input pulley A is operated to be closed so that the torque ratio T is decreased. Accordingly, the torque ratio is reduced by a desired degree by controlling the period of opening of the electromagnetic valve 84 as occasion demands for up-shift operation. In this case, the leakage of the hydraulic fluid of the line pressure occurs only through a single part, namely, the opening of the valve seat of the up-shift electromagnetic valve 84.

Down-Shift

The electromagnetic valve 85 is opened by the output signal of the electric control circuit 90 as shown in FIG. 32-B so that the oil chamber 816 is drained. The spool 812 is moved quickly to the left by the agency of the spring 811 and the line pressure applied to the oil chamber 815 and hence the oil passage 2 is drained through the drain port 814 so that the input pulley A is expanded quickly to provide an increased torque ratio T. Thus, the period of opening of the electromagnetic valve 85 is controlled to provide an increased torque ratio T for down-shift operation. In this case, the leakage of the hydraulic fluid of the line pressure occurs only through a single part, namely, the opening of the valve seat of the down-shift electromagnetic valve 85.

Figure 33:
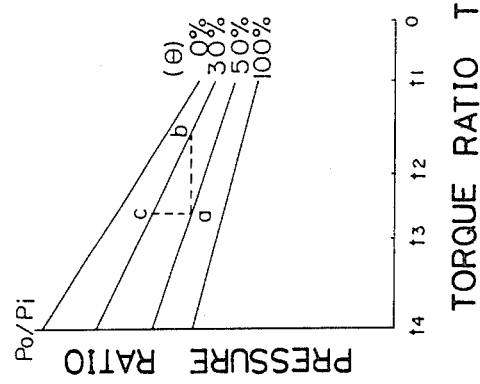
FIG. 33 is a graphical representation of the relation between the torque ratio T between the input and the output shafts and the pressure ratio between the input-side and the output-side hydraulic servomechanisms of a V-belt type continuously variable transmission.

Thus, the output oil pressure of the reduction ratio control valve 81 is applied to the hydraulic servomechanism C of the input pulley A (driving pulley), while the line pressure is applied to the hydraulic servomechanism E of the output pulley B (driven pulley). FIG. 33 shows the relationship between the ratio of the oil pressure Po within the hydraulic servomechanism E of the output pulley B to the oil pressure Pi within the hydraulic servomechanism C of the input pulley A (Po/Pi) and torque ratio T for various degrees of throttle opening $\theta$. For example, when the accelerator pedal is relaxed to reduce the degree of throttle opening $\theta$ down to 30% while the vehicle is running with the degree of throttle opening $\theta$ and the torque ratio T being set at 50% and 1.5 respectively (Point a in FIG. 33), the operating condition represented by Point a is transformed into an operating condition represented by Point b (T=0.87) if the pressure ratio Po/Pi is kept unvaried, whereas the operating condition is transformed into an operating condition represented by point c if the torque ratio T=1.5 is kept unvaried, as the pressure ratio Po/Pi is increased by the output signal of the reduction ratio controlling mechanism 80. Thus, controlling the value of the pressure ratio Po/Pi according to required operating condition enables optional torque ratio setting corresponding to the condition of the load.

Figure 36:
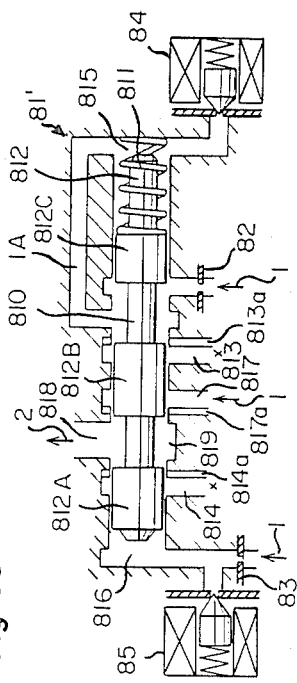
FIG. 36 is a representation of the constitution of a further embodiment of the reduction ratio control mechanism according to the present invention.
Figure 34:
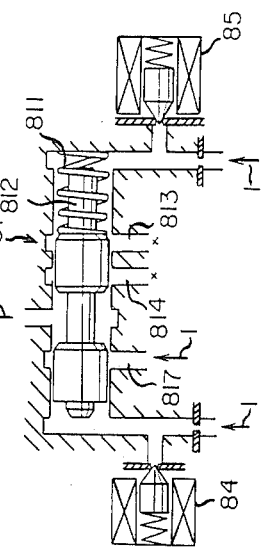
FIG. 34 is a representation of the constitution of an example of the conventional reduction ratio control mechanism.

FIG. 36 shows a further embodiment of the reduction ratio controlling mechanism for the continuously variable automatic transmission of a vehicle according to the present invention. In this embodiment, V-grooves 817a, 813a and 814a are formed in the respective walls of the port 817, drain port 813 and drain port 814, respectively, of the reduction ratio control valve 81. The respective function of those V-grooves are the same with those of the taper surfaces 812a, 812b and 812c formed in the lands of the spool 812 of the reduction ratio control valve 80 of the first embodiment. The V-grooves are more capable of preventing dust, such as chips, from entering the ports than the taper surfaces formed in the lands and are capable of reducing the possibility of valve sticking even if dust may enter the ports as the dust is cut by the edge of the lands.

Furthermore, the respective outer edges of the end lands 812A and 812C of the spool of this embodiment never cross the ports, therefore, interference between the edges of the ports is prevented and hence valve stick resulting from the eccentricity of the spool is less likely to occur.

As described hereinbefore, the present invention provides a reduction ratio controlling mechanism provided within the hydraulic control system of a continuously variable automatic transmission of a vehicle, which automatic transmission comprising a continuously variable transmission consisting of an input pulley and an output pulley, the effective diameter of each of which is varied by the agency of a hydraulic servomechanism, and a V-belt extended between the input and output pulleys, and comprising an up-shift electromagnetic valve and a down-shift electromagnetic valve each adapted to regulate a line pressure to produce a solenoid pressure corresponding to the running condition of the vehicle, and a reduction ratio control valve having a spool controlled by a spring load applied to one end thereof and a solenoid pressure applied thereto in opposite directions and adapted to connect the hydraulic servomechanism of the input pulley selectively to an oil pressure source or a drain port, wherein up-shift operation is achieved by draining the hydraulic fluid through the up-shift electromagnetic valve, down-shift operation is achieved by draining the hydraulic fluid through the down-shift electromagnetic valve, the maintenance of a constant transmission mode is established by the regulation of the solenoid pressure attained by draining the hydraulic fluid through a drain port formed in the reduction ratio control valve, displacement of the spool of the reduction ratio control valve in the direction of application of a spring load to the spool caused by the differential force between the sum of the spring load and a solenoid pressure provided by the up-shift electromagnetic valve and applied to one end of the spool in a direction the same with the direction of the spring load, and a solenoid pressure provided by the down-shift electromagnetic valve and applied to the other end of the spool in the opposite direction, the equilibration of the external forces working on the spool established by the relief of the solenoid pressure provided by the up-shift electromagnetic valve resulting from the draining of the hydraulic fluid of the solenoid pressure through the draining port of the reduction ratio control valve due to the displacement of the spool, and the regulation of the areas for communication between the hydraulic servomechanism of the input pulley, and the drain port of the reduction ratio control valve and the oil pressure source, with the spool placed in the equilibrated position, the reduction ratio control valve comprises a spool having one end land to which is applied the spring load, an intermediate land and the other end land, one end oil chamber to which is applied a solenoid pressure by the up-shift electromagnetic valve, an intermediate oil chamber formed between one end land and the intermediate land, having a port connected to the oil pressure source and a drain port and communicating with one end oil chamber by means of an oil passage, an oil pressure regulating chamber formed between the intermediate land and the other end land and having an output port connected to the hydraulic servomechanism of the input pulley, a line pressure receiving port connected to the oil pressure source and a drain port, the other end oil chamber to which is applied the solenoid pressure by the downshift electromagnetic valve, and the respective outer edges of both end lands of the spool of the reduction ratio control valve are formed so as to be outside of those ports at all times during the movement of the spool. Thus the present invention is capable of providing increased speed of downshift operation, for reducing the leakage of the hydraulic fluid and hence capable of allowing the employment of an oil pump of a reduced capacity and reducing fuel consumption, capable of reducing the possibility of valve sticking and capable of preventing the malfunction and the delayed operation of the reduction ratio control system.

We claim:

1. A reduction ratio controlling mechanism incorporated into a hydraulic control system with a pressure source (50) for a continuously variable automatic transmission including an input pulley combined with a hydraulic servomechanism for varying the effective diameter thereof, an output pulley combined with a hydraulic servomechanism for varying the effective diameter thereof, and a V-belt extended between said input pulley and said output pulley comprising:

a first passage (1) connected between said pressure source (50) and said hydraulic servomechanism of said output pulley;

a reduction ratio control valve (81) having a spool (812), a spring means (811) urging said spool (812) in one direction, an input port (817), a first chamber (816), a second chamber (815), a pressure regulating chamber (819), and a middle chamber (810);

a second passage connected between said pressure source (50) and said first chamber (816);

a third passage connected between said pressure source (50) and said input port (817) to communicate selectively with said pressure regulating chamber (819);

a fourth passage connected between said pressure source (50) and said reduction ratio control valve (81) to communicate selectively with said middle chamber (810);

a fifth passage (2) connected between said pressure regulating chamber (819) and said hydraulic servomechanism of said input pulley;

a sixth passage (1A) connected between said middle chamber (810) and said second chamber (815);

a first drain port (813) selectively communicated with said middle chamber (810);

a second drain port (814) selectively communicated with said pressure regulating chamber (819);

a down-shaft electromagnetic valve (85) provided in said first chamber (816) to control hydraulic fluid in said first chamber (816);

an up-shift electromagnetic valve (84) provided in said second chamber (815) to control hydraulic fluid in said second chamber (815);

whereby upon up-shifting operation, said up-shift electromagnetic valve (84) allows hydraulic fluid in said second chamber (815) to exhaust, while the hydraulic fluid in said first chamber (816) permits said spool (812) to move toward said second chamber (815) against the urging force of said spring means (811), interrupting said fifth passage (2) from communicating with said second drain port (814) to communicate with said input port (817), and at the same time, interrupting said sixth passage (1A) from communicating with said first drain port (813) to communicate with said fourth passage; upon down-shifting operation, said down-shift electromagnetic valve (85) allowing hydraulic fluid of said first chamber (816) to exhaust while the hydraulic fluid of said second chamber (815) and said spring means (811) permits said spool to move toward said first chamber (816), interrupting said fifth passage (29 from communicating with said input port (817) to communicate with said second drain port (814), and at the same time, interrupting said sixth passage (1A) from communicating with said fourth passage to communicate with said first drain port (813).

2. A reduction ratio controlling mechanism according to claim 1, wherein said spool (812) has one end land (812C), an intermediate land (812B) and another end land (812A), said pressure regulating chamber (819) formed between said intermediate land (812B) and said other end land (812A), said middle chamber (810) formed between said one end land (812C) and said intermediate land (812B).

3. A reduction ratio controlling mechanism according to claim 2, furthermore comprising grooves (817a, 813a, 814a) formed in said input port (817), said first drain port (813), and said second drain port (814).

* * * * *